United States Patent
Crow et al.

(10) Patent No.: US 9,753,828 B1
(45) Date of Patent: *Sep. 5, 2017

(54) ADAPTIVE FAILURE SURVIVABILITY IN A STORAGE SYSTEM UTILIZING SAVE TIME AND DATA TRANSFER UPON POWER LOSS

(71) Applicant: EMC IP Holding Company LLC, Hopkinton, MA (US)

(72) Inventors: Preston F. Crow, Ashland, MA (US); Preethi Natarajan, South Grafton, MA (US); Steven T. McClure, Northboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,138

(22) Filed: Aug. 20, 2015

Related U.S. Application Data (63) Continuation of application No. 13/628,259, filed on Sep. 27, 2012, now Pat. No. 9,141,505.

(51) Int. Cl.
G06F 11/30 (2006.01)
G06F 1/30 (2006.01)
(Continued)

(52) U.S. Cl.
CPC ............ *G06F 11/3058* (2013.01); *G06F 1/30* (2013.01); *G06F 3/068* (2013.01); *G06F 3/0619* (2013.01);
(Continued)

(58) Field of Classification Search
CPC ...... G06F 11/3037; G06F 11/30; G06F 11/30; G06F 11/3058; G06F 3/0619;
(Continued)

(56) References Cited

U.S. PATENT DOCUMENTS 4,531,214 A * 7/1985 Torres ................. G06F 11/0754
365/228
5,206,939 A * 4/1993 Yanai .................... G06F 3/0601
360/48

(Continued)

OTHER PUBLICATIONS

Microsoft Corporation, Microsoft Computer Dictionary, 2002, Microsoft Press, Fifth Edition, p. 575.*

*Primary Examiner* — Matt Kim
*Assistant Examiner* — Paul Contino
(74) *Attorney, Agent, or Firm* — Muirhead and Saturnelli, LLC

(57) ABSTRACT

Maintaining failure survivability in a storage system includes determining a save time corresponding to an amount of time needed to transfer system data from volatile memory to non-volatile memory, determining a threshold corresponding to time for batteries to run while transferring data from volatile memory to non-volatile memory after a power loss, and providing an indication in response to the save time being greater than the threshold. The system may include a plurality of directors and the save time and the threshold may be determined for each of the directors. Determining a threshold may include determining an amount of battery time provided by battery power following power loss and multiplying the amount of battery time by a factor less than one, such as 0.8.

16 Claims, 6 Drawing Sheets

(51) Int. Cl.
 *G06F 3/06* (2006.01)
 *G06F 12/08* (2016.01)
 *G06F 12/0868* (2016.01)

(52) U.S. Cl.
 CPC .......... *G06F 3/0653* (2013.01); *G06F 3/0656* (2013.01); *G06F 11/3037* (2013.01); *G06F 11/3055* (2013.01); *G06F 12/0868* (2013.01); *G06F 2212/1032* (2013.01); *G06F 2212/21* (2013.01); *G06F 2212/281* (2013.01); *G06F 2212/313* (2013.01)

(58) Field of Classification Search
 CPC ...... G06F 3/0653; G06F 3/0656; G06F 3/068; G06F 12/0868; G06F 2212/1032; G06F 2212/21; G06F 2212/281; G06F 2212/313
 See application file for complete search history.

(56) References Cited

U.S. PATENT DOCUMENTS

| | | | | |
|---|---|---|---|---|
| 5,283,792 A * | 2/1994 | Davies, Jr. | G06F 1/30 | 714/22 |
| 5,438,549 A * | 8/1995 | Levy | G11O 5/141 | 365/185.08 |
| 5,742,792 A * | 4/1998 | Yanai | G06F 3/0601 | 710/1 |
| 5,778,394 A * | 7/1998 | Galtzur | G06F 11/1451 | 707/999.1 |
| 5,784,548 A * | 7/1998 | Liong | G06F 1/30 | 711/106 |
| 5,799,200 A * | 8/1998 | Brant | G06F 11/1441 | 365/229 |
| 5,845,147 A * | 12/1998 | Vishlitzky | G06F 9/52 | 710/200 |
| 5,857,208 A * | 1/1999 | Ofek | G06F 11/1451 | 707/999.202 |
| 6,115,824 A * | 9/2000 | Ha | G06F 1/30 | 713/300 |
| 6,195,754 B1 * | 2/2001 | Jardine | G06F 1/30 | 713/324 |
| 6,295,577 B1 * | 9/2001 | Anderson | G06F 11/1441 | 711/111 |
| 6,535,996 B1 * | 3/2003 | Brewer | G06F 11/1441 | 714/14 |
| 6,684,306 B1 * | 1/2004 | Nagasawa | G06F 11/1458 | 711/154 |
| 6,694,453 B1 * | 2/2004 | Shukla | G06F 1/30 | 713/340 |
| 6,967,890 B2 * | 11/2005 | Shen | G06F 1/28 | 320/132 |
| 6,990,603 B2 * | 1/2006 | Strasser | G06F 11/1441 | 711/133 |
| 7,003,620 B2 * | 2/2006 | Avraham | G06F 11/1441 | 711/102 |
| 7,054,883 B2 * | 5/2006 | Meiri | G06F 17/30067 | |
| 7,210,045 B2 * | 4/2007 | Dunstan | G06F 21/62 | 348/E5.006 |
| 7,380,055 B2 * | 5/2008 | Ashmore | G06F 1/3203 | 711/112 |
| 7,392,429 B2 * | 6/2008 | Frank | G06F 1/30 | 714/22 |
| 7,406,624 B2 * | 7/2008 | Robinson | G06F 11/1441 | 714/23 |
| 7,484,060 B2 * | 1/2009 | Kelly | G06F 21/6245 | 711/112 |
| 7,487,391 B2 * | 2/2009 | Pecone | G06F 1/28 | 714/14 |
| 7,634,688 B2 * | 12/2009 | Madter | G06F 12/0804 | 714/14 |
| 7,669,008 B2 * | 2/2010 | Kubo | G06F 12/126 | 711/113 |
| 7,793,061 B1 * | 9/2010 | Gupta | G06F 11/1441 | 711/108 |
| 7,817,513 B2 * | 10/2010 | Okaya | G11B 20/10527 | 369/47.32 |
| 7,886,099 B2 * | 2/2011 | Bono | G06F 1/30 | 710/260 |
| 7,937,602 B2 * | 5/2011 | Elliott | G06F 1/305 | 713/300 |
| 7,954,006 B1 * | 5/2011 | Mangipudi | G06F 1/30 | 713/340 |
| 7,962,787 B2 * | 6/2011 | Camilleri | G06F 11/1441 | 323/282 |
| 8,024,516 B2 * | 9/2011 | Miura | G06F 11/1441 | 711/112 |
| 8,046,546 B2 * | 10/2011 | Sartore | G06F 11/1441 | 711/101 |
| 8,074,034 B2 * | 12/2011 | Sartore | G06F 12/0638 | 711/119 |
| 8,074,112 B1 * | 12/2011 | Chang | G06F 11/1441 | 713/340 |
| 8,156,376 B2 * | 4/2012 | Chen | G06F 11/2015 | 714/14 |
| 8,200,885 B2 * | 6/2012 | Sartore | G06F 11/1441 | 711/100 |
| 8,200,929 B1 * | 6/2012 | Sartore | G06F 12/0638 | 711/119 |
| 8,250,264 B2 * | 8/2012 | Tang | G06F 11/1441 | 710/68 |
| 8,296,534 B1 * | 10/2012 | Gupta | G06F 12/0804 | 711/103 |
| 8,396,515 B2 * | 3/2013 | Sarker | G06F 1/3225 | 455/127.3 |
| 8,429,674 B2 * | 4/2013 | Maeckel | G06F 9/485 | 455/556.2 |
| 8,589,733 B2 * | 11/2013 | Di Domenico | G06F 11/1441 | 714/24 |
| 8,615,681 B2 * | 12/2013 | Horn | G06F 12/0804 | 714/24 |
| 8,645,735 B1 * | 2/2014 | Ardis | G06F 1/3275 | 340/541 |
| 8,650,363 B2 * | 2/2014 | Sartore | G06F 12/0638 | 711/113 |
| 8,788,880 B1 * | 7/2014 | Gosla | G11B 20/10527 | 714/16 |
| 9,037,820 B2 * | 5/2015 | Ratn | G06F 11/1441 | 707/682 |
| 9,122,615 B1 * | 9/2015 | Jenkins | G06F 12/0868 | |
| 9,141,505 B1 * | 9/2015 | Crow | G06F 11/3058 | |
| 9,298,252 B2 * | 3/2016 | Ellis | G06F 1/3268 | |
| 9,336,089 B2 * | 5/2016 | Yuasa | G06F 11/1441 | |
| 9,570,159 B1 * | 2/2017 | Wakchaure | G11C 11/5628 | |
| 9,626,260 B2 * | 4/2017 | Baek | G06F 11/1435 | |
| 2004/0103238 A1 * | 5/2004 | Avraham | G06F 11/1441 | 711/102 |
| 2006/0015683 A1 * | 1/2006 | Ashmore | G06F 1/3203 | 711/113 |
| 2006/0139069 A1 * | 6/2006 | Frank | G06F 1/30 | 327/143 |
| 2008/0046638 A1 * | 2/2008 | Maheshwari | G06F 13/1694 | 711/103 |
| 2008/0104344 A1 * | 5/2008 | Shimozono | G06F 11/1441 | 711/162 |
| 2008/0222359 A1 * | 9/2008 | Ninomiya | G06F 12/0811 | 711/122 |
| 2009/0031072 A1 * | 1/2009 | Sartore | G06F 12/0638 | 711/102 |
| 2009/0144577 A1 * | 6/2009 | Sarker | G06F 1/3225 | 713/340 |
| 2009/0235038 A1 * | 9/2009 | Sartore | G06F 12/0638 | 711/162 |
| 2010/0061207 A1 * | 3/2010 | Trantham | G11B 27/36 | 369/53.1 |
| 2010/0202236 A1 * | 8/2010 | Kahler | G06F 11/1441 | 365/228 |
| 2010/0262392 A1 * | 10/2010 | Murphy | G06F 3/0625 | 702/63 |
| 2010/0293337 A1 * | 11/2010 | Murphy | G06F 12/0866 | 711/136 |

(56) References Cited

U.S. PATENT DOCUMENTS

| | | | |
|---|---|---|---|
| 2011/0078379 A1* | 3/2011 | Iida | G06F 11/1441 711/118 |
| 2011/0197039 A1* | 8/2011 | Green | G06F 3/0617 711/162 |
| 2011/0202728 A1* | 8/2011 | Nichols | G06F 9/461 711/141 |
| 2011/0239043 A1* | 9/2011 | Vedder | G06F 1/263 714/14 |
| 2012/0023506 A1* | 1/2012 | Maeckel | G06F 9/485 719/318 |
| 2012/0079291 A1* | 3/2012 | Yang | G06F 1/263 713/300 |
| 2012/0151118 A1* | 6/2012 | Flynn | G06F 11/1008 711/6 |
| 2012/0170435 A1* | 7/2012 | Trantham | G11B 27/36 369/53.42 |
| 2012/0221801 A1* | 8/2012 | Okawa | G06F 1/3212 711/154 |
| 2012/0221891 A1* | 8/2012 | Shimizu | G06F 11/1441 714/15 |
| 2012/0324252 A1* | 12/2012 | Sarker | G06F 1/3225 713/300 |
| 2013/0019076 A1* | 1/2013 | Amidi | G06F 11/1441 711/162 |
| 2013/0097458 A1* | 4/2013 | Sekino | G06F 11/1441 714/6.3 |
| 2013/0166864 A1* | 6/2013 | Yerushalmi | G06F 3/0625 711/162 |
| 2014/0013047 A1* | 1/2014 | Sawin | G06F 12/0862 711/113 |
| 2014/0032818 A1* | 1/2014 | Chang | G06F 3/0685 711/103 |

* cited by examiner

ADAPTIVE FAILURE SURVIVABILITY IN A STORAGE SYSTEM UTILIZING SAVE TIME AND DATA TRANSFER UPON POWER LOSS

CROSS-REFERENCE TO RELATED APPLICATIONS

This application is a continuation of U.S. patent application Ser. No. 13/628,259 filed on Sep. 27, 2012 (pending).

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

During operation, some data for a storage system may be temporarily stored in volatile memory. For example, data that is usually on disks may temporarily be cached in volatile memory to improve performance of the system. Any disk data that is modified after being read into cache is eventually destaged (written) back to the disk. In addition, metadata and other system parameters may be stored in volatile memory. It is desirable to maintain this data if a system power failure occurs. To this end, the system may be provided with battery backup that may be used in connection with transferring data from volatile memory to non-volatile memory following a power failure.

Generally, a system may be designed so that if power fails, the battery has enough power (time) to transfer data from volatile memory to non-volatile memory. However, in some instances, a power failure may be preceded by component failures that may affect the amount of time it takes to transfer data from volatile memory to non-volatile memory. It also possible for components of the battery to fail, thus decreasing battery power and the amount of time available to transfer the data. When the system is thus degraded, it is useful for a user (operator) to know when there is no longer enough battery power to guarantee transfer of all of the data from volatile memory to non-volatile memory following a power failure. It may also be useful to take steps to decrease an amount of time needed to transfer the data. Accordingly, it is desirable to provide a system that addresses these issues.

SUMMARY OF THE INVENTION

According to the system described herein, maintaining failure survivability in a storage system includes determining a save time corresponding to an amount of time needed to transfer system data from volatile memory to non-volatile memory, determining a threshold corresponding to time for batteries to run while transferring data from volatile memory to non-volatile memory after a power loss, and providing an indication in response to the save time being greater than the threshold. The system may include a plurality of directors and the save time and the threshold may be determined for each of the directors. The indication may be provided in response to a save time for at least one of the directors being greater than the threshold for the at least one of the directors. Determining a threshold may include determining an amount of battery time provided by battery power following power loss and adjusting that amount by, for example, subtracting a predetermined value. Maintaining failure survivability in a storage system may also include destaging cache data from volatile memory to disks of the storage device in response to the save time being greater than the threshold. Maintaining failure survivability in a storage system may also include performing additional reconfiguration in response to the save time being greater than the threshold. The additional reconfiguration may include changing data set to be stored in a first portion of non-volatile memory to be set to be stored in a second, different, portion of volatile memory. The save time may include a time to transfer data to the non-volatile memory and a time to store data in the non-volatile memory. The save time may further include a time to encrypt data prior to storage in the non-volatile memory.

According further to the system described herein, computer software, provided in non-volatile computer storage, maintains failure survivability in a storage system. The software includes executable code that determines a save time corresponding to an amount of time needed to transfer system data from volatile memory to non-volatile memory, executable code that determines a threshold corresponding to time for batteries to run while transferring data from volatile memory to non-volatile memory after a power loss, and executable code that provides an indication in response to the save time being greater than the threshold. The system may include a plurality of directors and the save time and the threshold may be determined for each of the directors. The indication may be provided in response to a save time for at least one of the directors being greater than the threshold for the at least one of the directors. Executable code that determines a threshold may determine an amount of battery time provided by battery power following power loss and adjusting that amount by, for example, subtracting a predetermined value. The software may also include executable code that destages cache data from volatile memory to disks of the storage device in response to the save time being greater than the threshold. The software may also include executable code that performs additional reconfiguration in response to the save time being greater than the threshold. The additional reconfiguration may include changing data set to be stored in a first portion of non-volatile memory to be set to be stored in a second, different, portion of volatile memory. The save time may include a time to transfer data to the non-volatile memory and a time to store data in the non-volatile memory. The save time may further include a time to encrypt data prior to storage in the non-volatile memory.

DETAILED DESCRIPTION OF VARIOUS EMBODIMENTS

Figure 1:
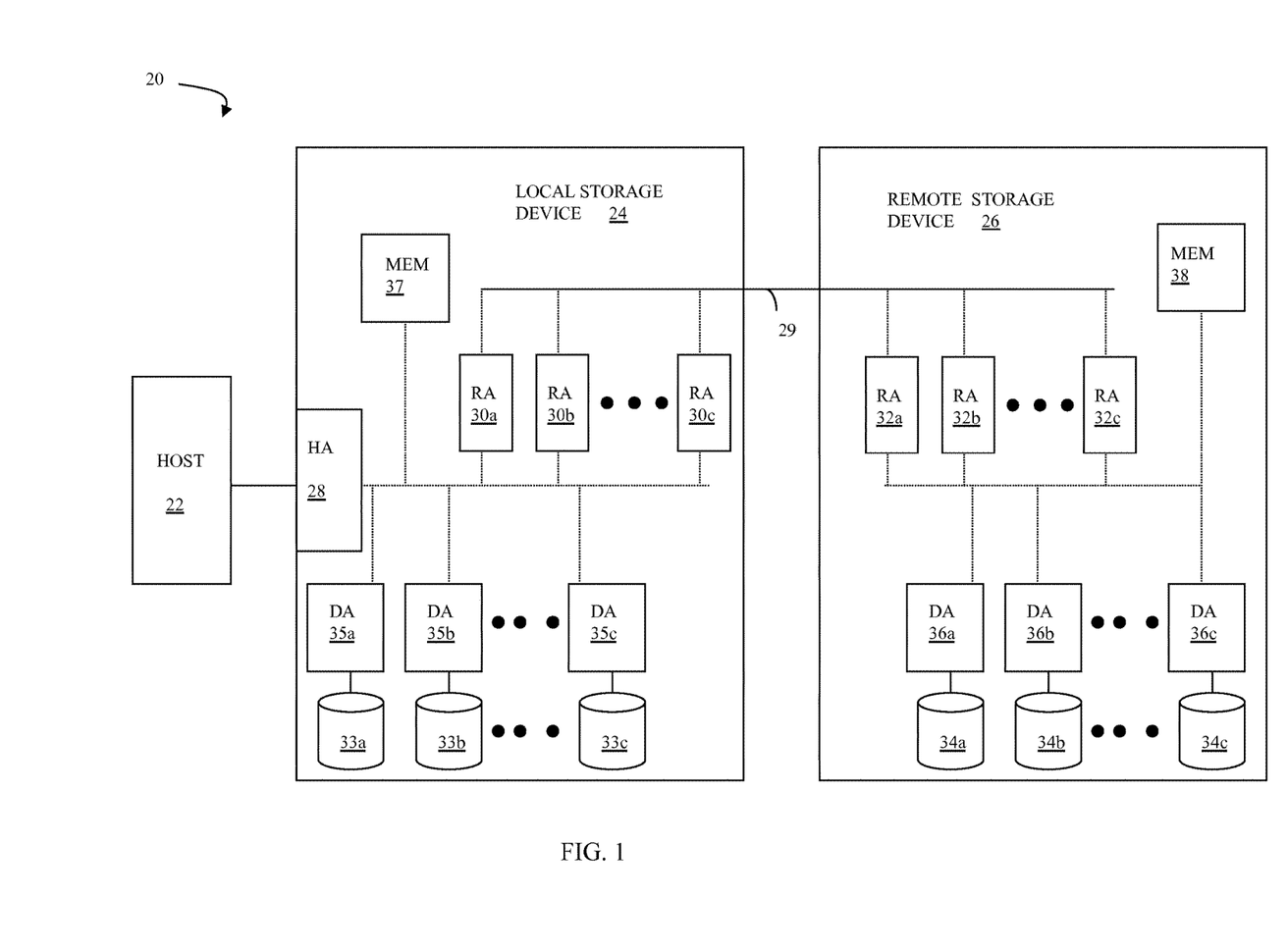
FIG. 1 is a schematic diagram showing a host, a local storage device, and a remote data storage device used in connection with an embodiment of the system described herein.

Referring to FIG. 1, a diagram 20 shows a relationship between a host 22, a local storage device 24, and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via a link 29 to cause the data on the remote storage device 26 to be identical to the data on the local storage device 24. In an embodiment herein, data may be copied using a synchronous RDF protocol (SRDR/S), an asynchronous RDF protocol (SRDF/A), and data mobility (DM) copy mode, a non-ordered background copy mode. Of course, other data copy modes may also be used. Communication using synchronous RDF is described, for example, in U.S. Pat. No. 5,742,792 titled "REMOTE DATA MIRRORING" to Yanai, et al., which is incorporated by reference herein. Communication using asynchronous RDF is described, for example, in in U.S. Pat. No. 7,054,883 titled "VIRTUAL ORDERED WRITES FOR MULTIPLE STORAGE DEVICES" to Meiri, et al., which is incorporated by reference herein.

Although only one link is shown (the link 29), it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail elsewhere herein.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The remote data copying functionality described herein may be applied so that the data for at least a portion of the disks 33a-33c of the local storage device 24 is copied, using RDF or a different mechanism, to at least a portion of the disks 34a-34c of the remote storage device 26. It is possible that other data of the storage devices 24, 26 is not copied between the storage devices 24, 26, and thus is not identical.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 may be used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c. Other physical storage elements may be used for physical storage, such as flash drives, so that the disks 34a-34c may be understood to include conventional disk drive units as well as flash memory and/or other appropriate physical storage.

Providing a mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the mapping causes modified data to be transferred from the local storage device 24 to the remote storage device 26 using the RA's, 30a-30c, 32a-32c and the link 29. In steady state operation, the logical device on the remote storage device 26 contains data that is identical to the data of the logical device on the local storage device 24. When the RDF mechanism is used, the logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
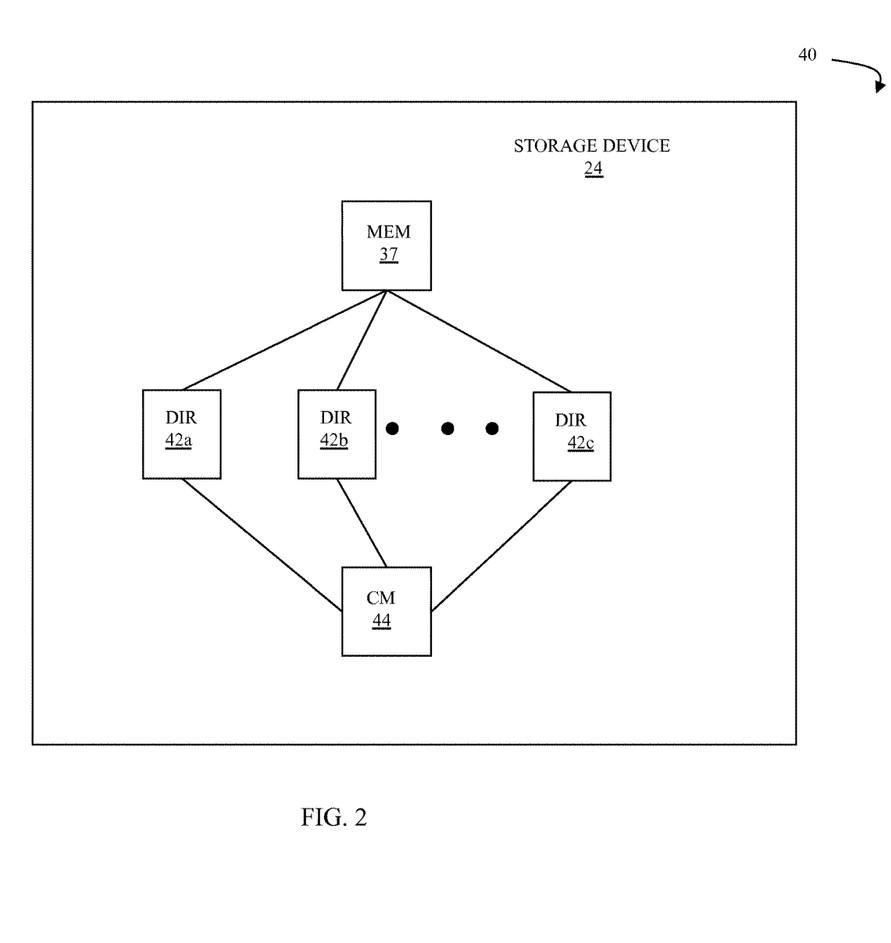
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and/or FIG. 2 or may be implemented using a platform that is somewhat or even completely different from any particular platform described herein.

Figure 3:
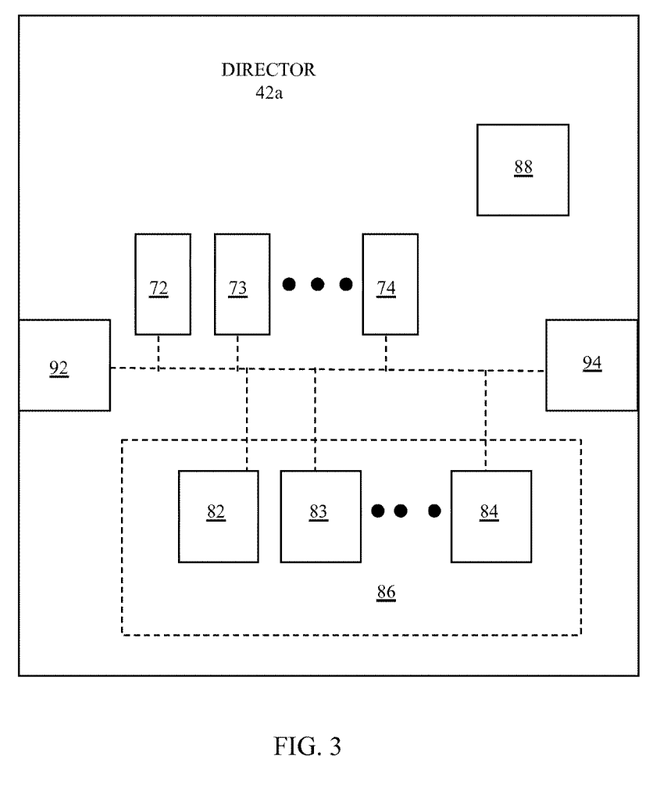
FIG. 3 is a schematic diagram showing a director in more detail according to an embodiment of the system described herein.

Referring to FIG. 3, the director 42a is shown in detail as including a plurality of director components 72-74 coupled to a bus 76. The director components 72-74 may include conventional processing components that provide functionality of the director 42a-42c as described herein. The director components 72-74 may include one or more processors, RAM, ROM, etc. The bus 76 provides electrical signal interconnection between the components 72-74 and allows an exchange of electrical signals therebetween. Any appropriate technology may be used to provide functionality for the bus 76. In an embodiment herein, the bus 76 may be implemented using conventional PCIe bus technology.

The director 42a also includes a plurality of vault components 82-84 that form a vault 86 used for non-volatile storage of data. Data provided to the vault 86 is maintained even after being powered down. The vault components 82-84 may be implemented using writeable non-volatile memory elements, such as flash memory or similar. The director 42a also includes a battery 88 that provides emergency electrical power to the components 82-74, 82-84, as well as possibly other components, when there is no other electrical power being provided. In an embodiment herein, when regular electrical power is unexpectedly lost, the system copies data from volatile global memory 37 (described above) and possibly other volatile memory locations to the vault 86 and possibly other non-volatile memory locations using power from the battery 88. Obviously, it is desirable to copy all of the data from volatile memory to non-volatile memory before the battery 88 runs out of power.

The director 42a may also include off-board communication elements 92, 94 that facilitate communication between the directors 42a-42c. In an embodiment herein, the directors 42a-42c may be interconnected using a conventional SAN fabric, although any appropriate mechanism may be used. In some cases, following a power loss, data in volatile memory in one of the directors 42a-42c may be transferred to another one of the directors 42a-42c and then copied to non-volatile memory in the other one of the directors 42a-42c.

In an embodiment herein, it is desirable that the battery 88, as well as batteries of other directors, contain enough power to ensure that all data stored in volatile memory is transferred to the vault 86 (and other non-volatile memory, as appropriate). In instances where data may be encrypted prior to being transferred to the vault 86, then the amount of power needed includes power for one or more processors to encrypt data as well as power to maintain the system while data is being encrypted.

Generally, a system may be designed to have enough battery power to transfer volatile memory data to non-volatile memory in response to a power loss. However, failure of one or more elements of the system may result in degradation that possibly impacts an amount of time needed to save data. For example, if PCIe is used for interconnection of the components 72-74, 82-84, 92, 94 of the director 42a, then it is possible that some of the lanes (PCIe electrical interconnections) used to increase the bandwidth of the PCIe interconnections may fail. Such a failure could, for example, increase the amount of time needed to transfer data to the vault 86. Similarly, some or all of the data interconnection between the directors 42a-42c may degrade or fail, thus decreasing a speed at which data is transferred between the directors 42a-42c. In some embodiments, the actual failures may be at one of several discrete speeds, but not a continuous range, so, for example, data interconnection speeds between the directors 42a-42c may be at ½ or ¼ full speed, but not at ⅓ full speed.

It is also possible for one or more of the components 82-84 of the vault 86 to fail and/or degrade, thus decreasing an amount of data that may be stored in the vault. In such a case, it may become necessary to redirect storage for volatile data for an affected one of the directors 42a-42c from storage at a local vault to storage at a vault of a different one of the directors 42a-42c, thus increasing an amount of time needed to transfer data in volatile memory. In some instances, encryption may be used to for data stored in the vault 86 so that failure and/or degradation of one or more of the components 72-74 used to perform encryption (e.g., a processor or a secure chip) could increase an amount of time needed to back up data to the vault 86. Generally, failure and/or degradation of particular one(s) of the components 72-74 used to perform movement of data from volatile memory to non-volatile memory could increase an amount of time needed to back up data from volatile memory to the vault 86. Note that it is also possible for the battery 88 to fail or degrade, which may not necessarily affect an amount of time needed to move data from volatile memory to the vault 86, but could affect an amount of time available until the battery 88 (or possible a different and/or back up battery, not shown) runs out of power.

Note that it is also possible for one of the directors 42a-42c to fail entirely. Of course, such a failure would means that the vault of the failed director is not available for storage and the processing components are not available for encryption or other processing used to store data in non-volatile memory. However, in an embodiment herein, each of the directors 42a-42c may have a corresponding mirror director (not shown) that is used to provide fault tolerance and contains essentially the same data. Thus, failure of one of the directors 42a-42c would not necessarily cause failure of the entire system. Note also that failure of one of the directors 42a-42c reduces the amount of data that needs to be stored in a vault since the specific data in volatile memory of the failed director is likely to be lost.

Figure 4:
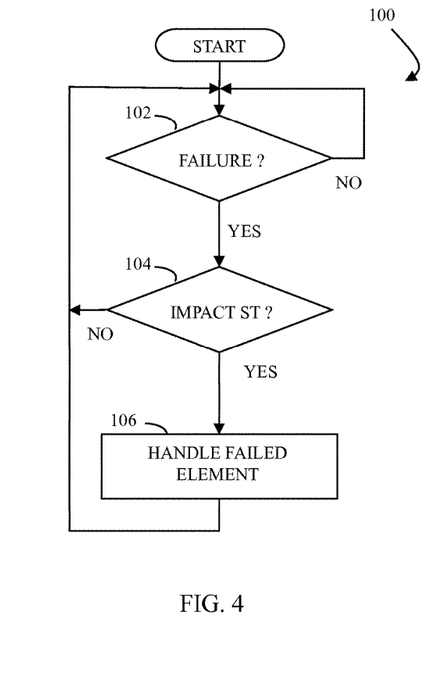
FIG. 4 is a flow chart illustrating processing performed in connection with detecting and handling failed elements of a system according to an embodiment of the system described herein.

Referring to FIG. 4, a flow chart 100 illustrates processing performed in connection with handling failure of a system element that may affect whether the system can save volatile data to non-volatile memory before battery power runs out. Processing begins at a first step 102 where the system waits for failure of an element. If no element has failed, the step 102 is continuously reexecuted. Note that any other appropriate mechanism may be used to conditionally perform specific processing in response to failure of an element. Note also that failure reporting may be provided by any appropriate mechanism, such as an interrupt or periodic testing of the functionality.

If it is determined at the step 102 that an element of the system has failed, then control transfers from the test step 102 to a test step 104 where it is determined if the failure affects the save time or battery power needed to transfer data in volatile memory to a vault. Note that there may be some failures which have no effect on the save time for data in volatile memory. If it is determined at the test step 104 that the failure does not affect the save time or battery power, then control transfers from the step 104 back to the step 102, described above, for another iteration. Otherwise, control transfers from the test step 104 to a step 106 where the system determines and handles the effect of the failed element. Processing at the step 106 is described in more detail elsewhere herein. Following the step 106, control transfers back to the step 102, discussed above, for another iteration.

Figure 5:
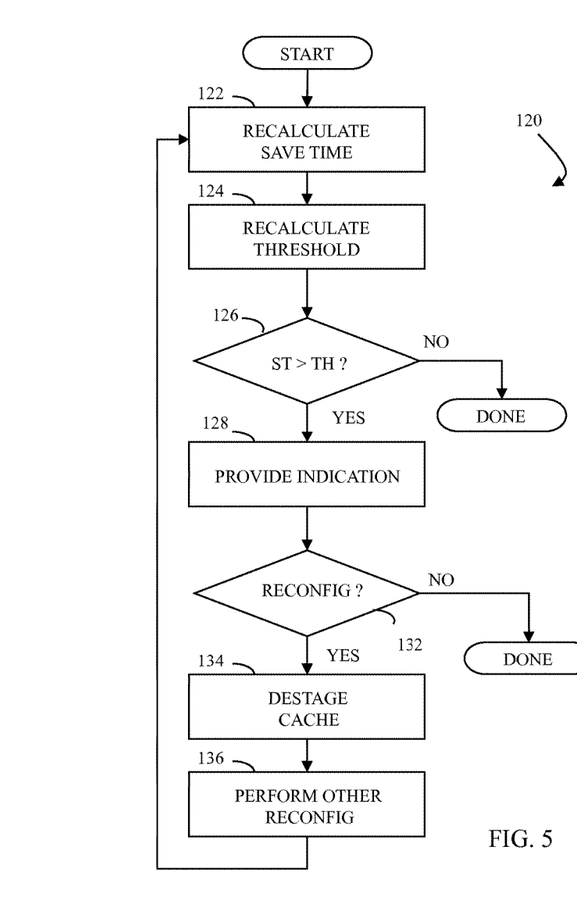
FIG. 5 is a flow chart illustrating in more detail processing performed in connection with handling a failed element of a system according to an embodiment of the system described herein.

Referring to FIG. 5, a flow chart 120 illustrates in more detail processing performed at the step 106, described above, where the system determines and handles the effect of a failed element. Processing begins at a first step 122 where the save time is recalculated. As discussed elsewhere herein, the save time is an amount of time it takes for the system to transfer all of the data from volatile memory to non-volatile memory (e.g., the vault 86). Determining the save time at the step 122 is described in more detail elsewhere herein.

Following the step 122 is a step 124 where a threshold is calculated. The threshold determined at the step 124 corresponds to an amount of time available to transfer data from volatile memory to non-volatile memory, which is a function of battery power. As discussed elsewhere herein, in some instances it is possible for the battery to be damaged and/or degraded, in which case the amount of time available, and thus the threshold, decreases. Determining the threshold at the step 124 is discussed in more detail elsewhere herein.

Following the step 124 is a test step 126 where it is determined if the save time determined at the step 122 is greater than the threshold determined at the step 124. If not, then processing is complete. Otherwise, control transfers from the test step 126 to a step 128 where an indication is provided that there is not enough time to transfer all of the data from volatile memory to non-volatile memory in the event of a power failure. The indication may take any appropriate form, such as an alert to a user (e.g., IT/storage administrator) with message informing the user that there is a risk that it may not be possible to transfer all data from volatile memory to non-volatile memory if power is lost. The processing performed at the step 128 may include any appropriate mechanism, including an automated alert system, message logging, etc. In some embodiments, the user may be provided with an opportunity to power the system down. Note that, for a planned power down, the system may appropriately save all data in volatile memory. In addition, in some cases, a planned power down operation may include destaging cache data to disks, thus decreasing the amount of data that needs to be stored in a vault.

Following the step 128 is a test step 132 where it is determined if a reconfiguration is to be performed. In some cases, it may be possible to reconfigure data in volatile memory so as to decrease the save time. The result of the test at the step 132 may be based on a prompt provided to the user at the step 128 and a subsequent user response and/or may be automatic and/or may depend on particular criteria, such as the magnitude of the difference between the save time and the threshold, etc.

If it is determined at the test step 132 that reconfiguration is not being performed, then processing is complete. Otherwise, control transfers from the test step 132 to a step 134 where at least some of the data in the cache memory is destaged to the disks 34a-34c. Note that it is possible for a significant amount of data in volatile memory to include data in cache (global memory 37) waiting to be destaged to the disks 34a-34c. Thus, it may be possible to decrease the save time by decreasing the amount of data in the cache. Following the step 134 is a step 136 where other reconfiguration is performed (that is, other than destaging cache data). Processing performed at the step 136 is described in more detail elsewhere herein, but note generally that it may include any appropriate mechanism for reducing the save time. Following the step 136, control transfers back to the step 122, discussed above, for another iteration.

In some embodiments, data may be transferred from volatile to non-volatile memory at a plurality of separate and relatively independent units, such as at each of the directors 42a-42c. Thus, following a power loss, data may be transferred from volatile to non-volatile memory at the director 42a while, at the same time, data is transferred from volatile to non-volatile memory at the director 42b while, still at the same time, data is transferred from volatile to non-volatile memory at the director 42c, etc. Thus, the processing illustrated by the flow chart 120 may be performed for each of the independent units and the indication may be provided at the step 128 when the save time exceeds the threshold at at least one of the units.

Figure 6:
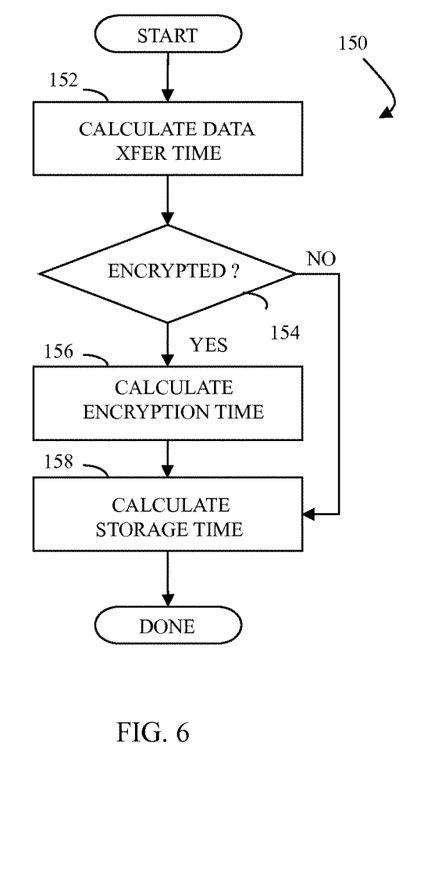
FIG. 6 is a flow chart illustrating processing performed in connection with determining save time according to an embodiment of the system described herein.

Referring to FIG. 6, a flow chart 150 illustrates in more detail processing performed in connection with determining the save time, discussed above in connection with the step 122 of the flow diagram 120 of FIG. 5. Processing begins at a first step 152 where data transfer time is calculated for all data stored in volatile memory. The transfer time represents an amount of time needed to transfer data from volatile memory to non-volatile memory (e.g., the vault 86) where the data is to be stored in the event of a power failure.

Following the step 152 is a test step 154 where it is determined if the data is to be encrypted prior to storage in non-volatile memory. In some cases, data is encrypted for security purposes so that the data can't be accessed from non-volatile memory without an ability to decrypt the encrypted data. If it is determined at the test step 154 that the data is to be encrypted, then control transfers from the test step 154 to a step 156 where an amount of time needed to encrypt the data is determined. Following the step 156 is a step 158 where an amount of time for storing data in non-volatile memory is determined. Note that the step 158 is also reached from the test step 154 if it is determined that the data is not to be encrypted. Following the step 158, processing is complete.

The save time corresponds to a sum of the different times determined in the processing illustrated by the flow chart 150. Note that, in some instances, data may be saved in parallel in different units (e.g., each of the directors 42a-42c) so that the processing illustrated by the flow chart 150 may be performed for each of the units.

Figure 7:
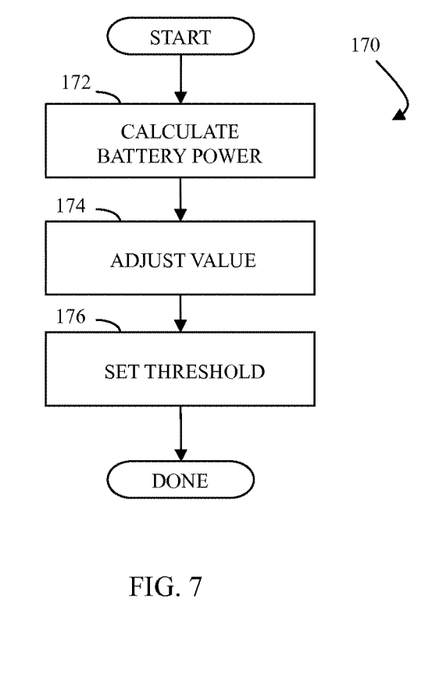
FIG. 7 is a flow chart illustrating processing performed in connection with determining a threshold according to an embodiment of the system described herein.

Referring to FIG. 7, a flow chart 170 illustrates processing performed in connection with determining a threshold at the step 124 of the flow chart 120, described above. Processing begins at a step 172 where the battery power is determined. As discussed elsewhere herein, the system may initially be provided with a particular amount of battery power which may be degraded due to failure of one or more battery-related components. The battery power determined at the step 172 may correspond to an expected amount of time that the battery would run if the system lost power.

Following the step 172 is a step 174 where the value determined at the step 172 is adjusted by, for example, subtracting a predetermined value. For example, if the value determined at the step 172 is five minutes, the result at the step 174 is four minutes (five minutes minus one minute). Alternatively, it is also possible at the step 174 to multiply the value determined at the step 172 by a number less than one. It some cases, it may be possible to do both. Following the step 174 is a step 176 where the threshold is set according to the value determined at the step 174. In an embodiment herein, the threshold is the value at the step 174. However, in other embodiments, the relationship may be more complex. For example, the threshold may be set to the greater of value from the step 174 and a desired minimum value, such as four seconds. Following the step 176, processing is complete. Note that the adjustment at the step 174 takes into account overhead time that may include any debounce time for very short power loss, time to detect a power loss, time to quiesce in-progress activities, time to activate encryption hardware (which might be a device that is used in a different mode during regular activity), etc.

Note that, just as with the processing illustrated by the flow chart 150, described above, it is possible for separate units to have different thresholds. For example, each of the directors 42a-42c may have a threshold that is separate and at least somewhat independent of all of the other thresholds of other ones of the directors 42a-42c.

Figure 8:
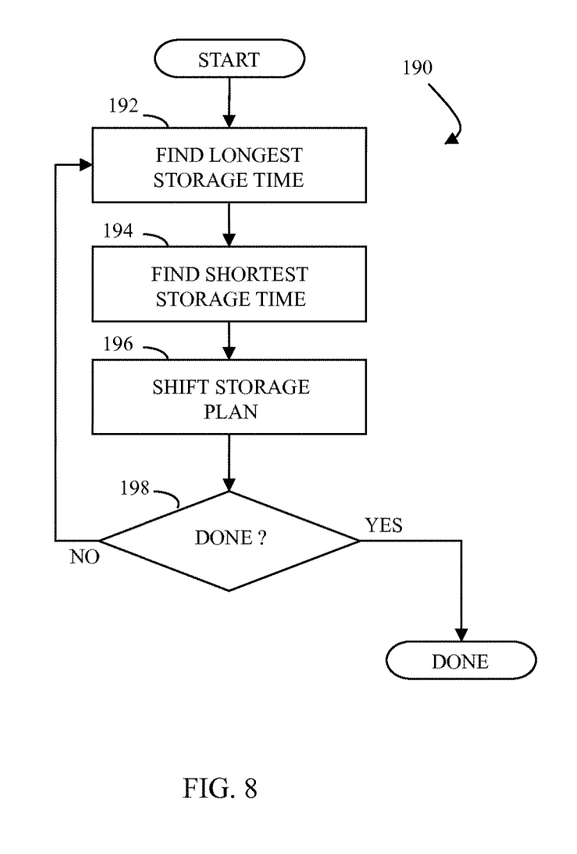
FIG. 8 is a flow chart illustrating processing performed in connection with reconfiguring data saving according to an embodiment of the system described herein.

Referring to FIG. 8, a flow chart 190 illustrates in more detail processing performed at the step 136 of the flow chart 120, described above, where data storage is reconfigured to reduce the save time. Processing begins at a first step 192 where a unit (e.g., one of the directors 42a-42c) having the longest save time is determined. Following the step 192 is a step 194 where a unit (e.g., one of the directors 42a-42c) having the shortest save time is determined. Following the step 194 is a step 196 where a storage plan is modified so that data that would have been stored to non-volatile memory on the unit having longest save time is set to be stored on the unit with the shortest save time. For example, if a particular section of data is initially set to be stored on non-volatile memory of unit A, having the longest save time, that data is subsequently set to be stored on non-volatile memory of unit B, having the shortest save time. This decreases the save time for unit A and increases the save time for unit B.

Following the step 196 is a test step 198 where it is determined if all of the units (e.g., directors 42a-42c) have been processed. Note that any appropriate criteria may be used at the test step 198, including ending processing when a difference between a unit having a longest save time and a unit having a shortest save time is less than a predetermined amount. If it is determined at the test step 198 that enough (or all) of the units have been processed, then processing is complete. Otherwise, control transfers back to the step 192 for another iteration.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is provided in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of maintaining failure survivability in a storage system, comprising:
    determining a save time corresponding to an amount of time needed to transfer system data from volatile memory to non-volatile memory;
    determining a threshold corresponding to time for batteries to run while transferring data from volatile memory to non-volatile memory after a power loss, wherein the threshold takes into account at least one of: debounce time for very short power loss, time to detect a power loss, time to quiesce in-progress activities, and time to activate encryption hardware;
    providing an indication in response to the save time being greater than the threshold; and
    changing a data set to be stored in a first portion of non-volatile memory to be set to be stored following a power failure in a second, different, portion of non-volatile memory in response to the save time being greater than the threshold, wherein the first portion corresponds to non-volatile memory having a longer save time than non-volatile memory of the second portion and wherein data is maintained in volatile memory following the indication indicating that the save time is greater than the threshold.

2. A method, according to claim 1, wherein the system includes a plurality of directors and wherein the save time and the threshold are determined for each of the directors.

3. A method, according to claim 2, wherein the indication is provided in response to a save time for at least one of the directors being greater than the threshold for the at least one of the directors.

4. A method, according to claim 1, wherein determining a threshold includes determining an amount of battery time provided by battery power following power loss and adjusting the amount.

5. A method, according to claim 4, wherein the amount of battery time is adjusted by subtracting a predetermined value.

6. A method, according to claim 1, further comprising:
    destaging cache data from volatile memory to disks of a storage device in response to the save time being greater than the threshold.

7. A method, according to claim 1, wherein the save time includes a time to transfer data to the non-volatile memory and a time to store data in the non-volatile memory.

8. A method, according to claim 7, wherein the save time further includes a time to encrypt data prior to storage in the non-volatile memory.

9. A non-transitory non-volatile computer readable storage medium having computer software stored therein that maintains failure survivability in a storage system, the software comprising:
    executable code that determines a save time corresponding to an amount of time needed to transfer system data from volatile memory to non-volatile memory;
    executable code that determines a threshold corresponding to time for batteries to run while transferring data from volatile memory to non-volatile memory after a power loss, wherein the threshold takes into account at least one of: debounce time for very short power loss, time to detect a power loss, time to quiesce in-progress activities, and time to activate encryption hardware;
    executable code that provides an indication in response to the save time being greater than the threshold; and
    executable code that changes a data set to be stored in a first portion of non-volatile memory to be set to be stored following a power failure in a second, different, portion of non-volatile memory in response to the save time being greater than the threshold, wherein the first portion corresponds to non-volatile memory having a longer save time than non-volatile memory of the second portion and wherein data is maintained in volatile memory following the indication indicating that the save time is greater than the threshold.

10. A non-transitory non-volatile computer readable storage medium, according to claim 9, wherein the system includes a plurality of directors and wherein the save time and the threshold are determined for each of the directors.

11. A non-transitory non-volatile computer readable storage medium, according to claim 10, wherein the indication is provided in response to a save time for at least one of the directors being greater than the threshold for the at least one of the directors.

12. A non-transitory non-volatile computer readable storage medium, according to claim 9, wherein executable code that determines a threshold determines an amount of battery time provided by battery power following power loss and adjusting the amount.

13. A non-transitory non-volatile computer readable storage medium, according to claim 12, wherein the amount of battery time is adjusted by subtracting a predetermined value.

14. A non-transitory non-volatile computer readable storage medium, according to claim 9, the software further comprising:
    executable code that destages cache data from volatile memory to disks of a storage device in response to the save time being greater than the threshold.

15. A non-transitory non-volatile computer readable storage medium, according to claim 9, wherein the save time includes a time to transfer data to the non-volatile memory and a time to store data in the non-volatile memory.

16. A non-transitory non-volatile computer readable storage medium, according to claim 15, wherein the save time further includes a time to encrypt data prior to storage in the non-volatile memory.

* * * * *